(12) United States Patent
Parks

(10) Patent No.: US 6,356,983 B1
(45) Date of Patent: Mar. 12, 2002

(54) SYSTEM AND METHOD PROVIDING CACHE COHERENCY AND ATOMIC MEMORY OPERATIONS IN A MULTIPROCESSOR COMPUTER ARCHITECTURE

(75) Inventor: David Parks, Colorado Springs, CO (US)

(73) Assignee: SRC Computers, Inc., Colorado Springs, CO (US)

(*) Notice: Subject to any disclaimer, the term of this patent is extended or adjusted under 35 U.S.C. 154(b) by 0 days.

(21) Appl. No.: 09/624,788

(22) Filed: Jul. 25, 2000

(51) Int. Cl.⁷ .............................................. G06F 12/00
(52) U.S. Cl. ...................................................... 711/145
(58) Field of Search ................................. 711/145, 150, 711/151, 130

(56) References Cited

U.S. PATENT DOCUMENTS

| | | | | |
|---|---|---|---|---|
| 4,755,930 A | * | 7/1988 | Wilson, Jr. et al. | 364/200 |
| 5,428,761 A | * | 6/1995 | Herlihy et al. | 395/425 |
| 5,485,594 A | * | 1/1996 | Foster | 395/427 |
| 5,680,576 A | * | 10/1997 | Laudon | 395/472 |
| 5,715,430 A | | 2/1998 | Kirayama | 395/468 |
| 5,717,898 A | | 2/1998 | Kagan | 395/472 |
| 5,737,568 A | | 4/1998 | Hamaguchi | 395/445 |
| 5,761,712 A | * | 6/1998 | Tran et al. | 711/126 |
| 5,781,757 A | | 7/1998 | Deshpande | 395/473 |
| 5,848,283 A | | 12/1998 | Moore | 398/800 |
| 5,943,684 A | | 8/1999 | Arimilli | 711/144 |
| 6,073,211 A | * | 6/2000 | Cheng et al. | 711/122 |

OTHER PUBLICATIONS

Cai, "Architectural and Multiprocessor Design Verification of the PowerPC 604 Data Cache," IEEE, pp383–388, Mar. 1995.*
Intel Datasheet, "Intel 440BX AGPset: 82443BX Host Bridge/Controller," pp 1–1, 1–2, Apr. 1998.*
"Handling Reservations in Multiple–Level Cache", IBM Technical Disclosure Bulletin, Dec. 1993, pp 441–446.*
Song et al., "The PowerPC 604 RISC Microprocessor", IEEE Micro, Oct. 1994, pp 8–17.*

* cited by examiner

Primary Examiner—Matthew Kim
Assistant Examiner—Stephen Elmore
(74) Attorney, Agent, or Firm—Stuart T. Langley; William J. Kubida; Hogan & Hartson LLP

(57) ABSTRACT

A cache coherency directory for a shared memory multiprocessor computer system. A data structure is associated with each cacheable memory location, the data structure comprising locations for storing state values indicating an exclusive state, a shared state, an uncached state, a busy state, a busy uncached state, a locked state, and a pending state. The busy state and pending state cooperate to reserve a cache line for future use by a processor while the cache line is currently being used by one or more other processors.

19 Claims, 6 Drawing Sheets

SYSTEM AND METHOD PROVIDING CACHE COHERENCY AND ATOMIC MEMORY OPERATIONS IN A MULTIPROCESSOR COMPUTER ARCHITECTURE

BACKGROUND OF THE INVENTION

1. Field of the Invention

The present invention relates, in general, to microprocessor systems, and, more particularly, to systems and methods for providing cache coherency and atomic transactions in a multiprocessor computer system.

2. Relevant Background

Microprocessors manipulate data according to instructions specified by a computer program. The instructions and data in a conventional system are stored in memory which is coupled to the processor by a memory bus. Computer programs are increasingly compiled to take advantage of parallelism. Parallelism enables a complex program to be executed as a plurality of less complex routines run in at the same time to improve performance.

Traditionally, microprocessors were designed to handle a single stream of instructions in an environment where the microprocessor had full control over the memory address space. Multiprocessor computer systems were developed to decrease execution time by providing a plurality of data processors operating in parallel. Early multiprocessor systems used special-purpose processors that included features specifically designed to coordinate the activities of the plurality of processors. Moreover, software was often specifically compiled to a particular multiprocessor platform. These factors made multiprocessing expensive to obtain and maintain.

The increasing availability of low-cost high performance microprocessors makes general purpose multiprocessing computers feasible. As used herein the terms "microprocessor" and "processor" include complex instruction set computers (CISC), reduced instruction set computers (RISC) and hybrids. However, general purpose microprocessors are not designed specifically for large scale multiprocessing. Some microprocessors support configurations of up to four processors in a system. To go beyond these limits, special purpose hardware, firmware, and software must be employed to coordinate the activities of the various microprocessors in a system.

Memory management is one of the more difficult coordination problems faced by multiprocessor system designers. Essentially, the problems surround ensuring that each processor has a consistent view of data stored in memory at any given time while each processor is operating simultaneously to access and modify the memory contents. This problem becomes quite complex as the number of processors increases.

Two basic architectures have evolved sometimes referred to as "shared memory" and "distributed memory". Distributed memory assigns a unique range of memory to each processor or to a small group of processors. In a distributed memory system only the small number of processors assigned to a given memory space need to coordinate their memory access activities. This assignment greatly simplifies the tasks associated with accessing and manipulating the memory contents. However, because the memory is physically partitioned there is less synergism and therefore less performance gain achieved by adding additional processors.

It is advantageous if all of the processors share a common memory address space. In a shared memory system hardware and software mechanisms are used to maintain a consistent view of the memory from each processor's perspective. Shared memory enables the processors to work on related processes and share data between processes. Shared memory systems offer a potential for greater synergism between processors, but at the cost of greater complexity in memory management.

One of the key advances that have resulted in microprocessors performance improvements is the integration of cache memory on chip with other microprocessor functional units. Cache memory enables a processor to store copies of frequently used portions of data and instructions from the main memory subsystem in a closely coupled, low latency cache memory. When data is supplied by cache memory, the latency associated with main memory access is eliminated. Inherent in a cache memory system is a need to guarantee coherency between the data copy in one or more processor cache(s) and the main memory itself.

In a single processor system coherency is a relatively straightforward matter because only one cache system hierarchy exits for a given memory address space. Likewise in partitioned memory systems one, or at most a few, cache subsystems corresponds to a single memory partition. However, in shared memory systems a given memory location may be stored in any cache of any processor in the system. In order for one processor to manipulate the data in its own cache or main memory it must ensure that no other processor can manipulate the data at the same time. In typical systems this requires high bandwidth communication between the cache subsystems and/or processors. Further, conventional microprocessors require specialized hardware support to scale the operating system and application software to operate on processor counts greater than four to eight processors.

Cache systems are organized as a plurality of cache lines that are typically accessed as an atomic unit. Each cache line is associated with a set of state information that indicates, for example, whether the cache line is valid (i.e., coherent with main memory), whether it is "dirty" (i.e., changed) and the like. Shared memory systems often use a (multi-state) protocol where each cache line includes state information. For example, a "MESI" protocol includes state information indicating whether the cache line is modified, exclusive, shared or invalid (MESI). Alternative coherency protocols include "update" protocols that send a new data value to each processor holding a cache copy of the value to update each cache copy. Ownership protocols pass an owner token among caches to indicate which cache has write permission and which cache holds the most recent version of the data.

In a MESI system, when an unshared cache line is accessed it is marked exclusive (E). A subsequent read does not change the state, but a subsequent write to the cache line changes the state to modified (M). If another processor is seen to load the data into that processor's cache, the line is marked shared (S). In order to write data to a shared cache line, an invalidate command must be sent to all processors, or at least to all processors having a copy of the shared data. Before a processor can load data from a modified line the processor having the modified cache line must write the data back to memory and remark it as shared. Any read or write to a cache line marked invalid (I) results in a cache miss.

Similar issues exist for any atomic memory operation. An atomic memory operation is one in which a read or write operation is made to a shared memory location. Even when the shared memory location is uncached, the atomic memory operation must be completed in a manner that ensures that any processors that are accessing the shared memory location are prevented from reading the location until the atomic operation is completed.

In shared memory multiprocessor systems in which all processors and main memory are physically connected using a common bus, a processor can query or "snoop" this state information of the other processors. Moreover, the requesting processor can manipulate this state information to obtain desired access to a given memory location by, for example, causing a cache line to be invalidated. However, accessing the cache of each processor by snooping is a time consuming process. Moreover, it is disruptive because the snoop request must arbitrate for cache access with the multiple ongoing cache requests generated by the processor's efforts to execute its own instructions. As the number of processors grows the overhead associated with this type of coherency protocol becomes impractical.

Other coherency systems require that the processors provide replacement hints to the memory management system. These hints provide a mechanism by which the processors cooperate in the indication of the current state of a cache line (e.g., whether the cache line remains exclusive to a particular processor). Although using replacement hints offers advantages, this requirement significantly limits the variety of available microprocessors that can be used for the multiprocessor system. A need exists for a system and method that provide cache coherency and atomic memory operations that does not require or rely on the processor providing replacement hints.

To alleviate both the engineering and scalability issues associated with snooped based coherency implementation, a directory approach is used. A data structure is employed to hold information about which processors hold which lines of memory as well as a superset of the MESI state information about the line. Rather than snooping each cache, the central directory structure can be queried to determine the state of each memory line. After examining the directory, only the necessary cache coherency operations are required to allocate the memory line to the requesting processor. A directory may be implemented as a full map, coarse map, partial map or a link list.

Alternatively, host bus locking can be used to ensure atomicity in a very brute force manner. The atomic operation support in the Intel architecture 32 (IA32) instruction set with uncached memory requires two bus operations: a read, followed by a write. While these operations proceed, a bus lock is asserted and thereby prevents other processors from utilizing the bus' unused bandwidth. This is particularly detrimental in computer systems where multiple processors and other components share the host bus. Asserting bus lock by any agent using the host bus will prevent the others from being able to start or complete any bus transaction to memory.

More complex multiprocessor architectures combine multiple processor boards where each processor board contains multiple processors coupled together with a shared front side bus. In such systems, the multiple boards are interconnected with each other and with memory using an interconnect network that is independent of the front side bus. In essence, each of the multiprocessing boards has an independent front side bus. Because the front side bus is not shared by all of the system processors, coherency mechanisms such as bus locking and bus snooping, which operate only on the front side bus, are difficult if not impossible to implement.

Accordingly, it is desirable to provide a cache coherency mechanism and method that operates efficiently to minimize overhead. More specifically, a means for providing cache management that does not rely on either conventional cache coherency mechanisms or bus locking mechanisms is needed. A further need exists for cache coherency mechanisms that operate on systems with multiple independent front side buses.

SUMMARY OF THE INVENTION

Briefly stated, the present invention involves a system and method of implementing both uncached references (including atomic references) and cached references within a multiprocessor system. The multiprocessor system includes a plurality of independent processor nodes each having one or more processors. A shared memory comprising a plurality of memory locations is accessible by each of the processor nodes. A cache is implemented within at least some of the processor nodes, each cache comprising a plurality of cache entries. A state machine is associated with each memory location, wherein the state machine includes an exclusive state, a locked state, a busy state, a pending state, an uncached state, a shared state and a busy uncached state. A current memory operation is performed including copying contents of a memory location into the cache of a first processor node. In response to a pending memory operation involving the memory location, the state machine for the memory location is manipulated to indicate that the cache line in the first processor node contains a copy of information that is desired by a second processor node. The state machine is then transitioned to the busy state. In response to an indication that the first processor node has terminated the current operation, the state machine is transitioned to the pending state. While in the pending state, the memory location is locked from access by any of the processor nodes.

In another aspect, the present invention involves a cache coherency directory for a shared memory multiprocessor computer. A data structure is associated with each cacheable memory location. The data structure has locations for storing state values indicating an exclusive state, a shared state, an uncached state, a busy state, a busy uncached state, a locked state, and a pending state. The busy state and pending state cooperate to reserve a cache line for future use by a processor while the cache line is currently being used by one or more other processors.

In yet another aspect the present invention involves a computing system having a plurality of processor nodes coupled to a communication bus. Each processor node contains two or more processors coupled together by a shared front side bus. A cache memory within each of the processor nodes, the cache memory comprising a plurality of cache lines. A shared memory includes a plurality of cacheable locations and is defined by an address space shared amongst all of the processor nodes. A state machine is associated with each cacheable location of the shared memory, the state machine implementing a state indicating that the associated cacheable location is currently in use by a first processor node and reserved for future use by a second processor node.

DETAILED DESCRIPTION OF THE PREFERRED EMBODIMENTS

The present invention is illustrated and described in terms of a general-purpose multiprocessing computing system comprising a number of substantially identical microprocessors having integrated cache memory. Although this type of computing system is a good tool for illustrating the features and principles of the present invention, it should be understood that a heterogeneous set of processors may be used. Some processors may include integrated cache, some processors may include external cache, and yet other processors may have no cache at all. The invention is illustrated in terms of a shared memory system, but certain aspects will have application in partitioned memory systems as well. Accordingly, the specific examples given herein are supplied for purposes of illustration and understanding and are not to be viewed as limitations of the invention except where expressly stated. Moreover, an important feature of the present invention is that it is readily scaled upwardly and downwardly to meet the needs of a particular application or processor count. Accordingly, unless specified to the contrary the present invention is applicable to significantly larger, more complex network environments as well as small network environments such as conventional local area network (LAN) systems.

Figure 1:
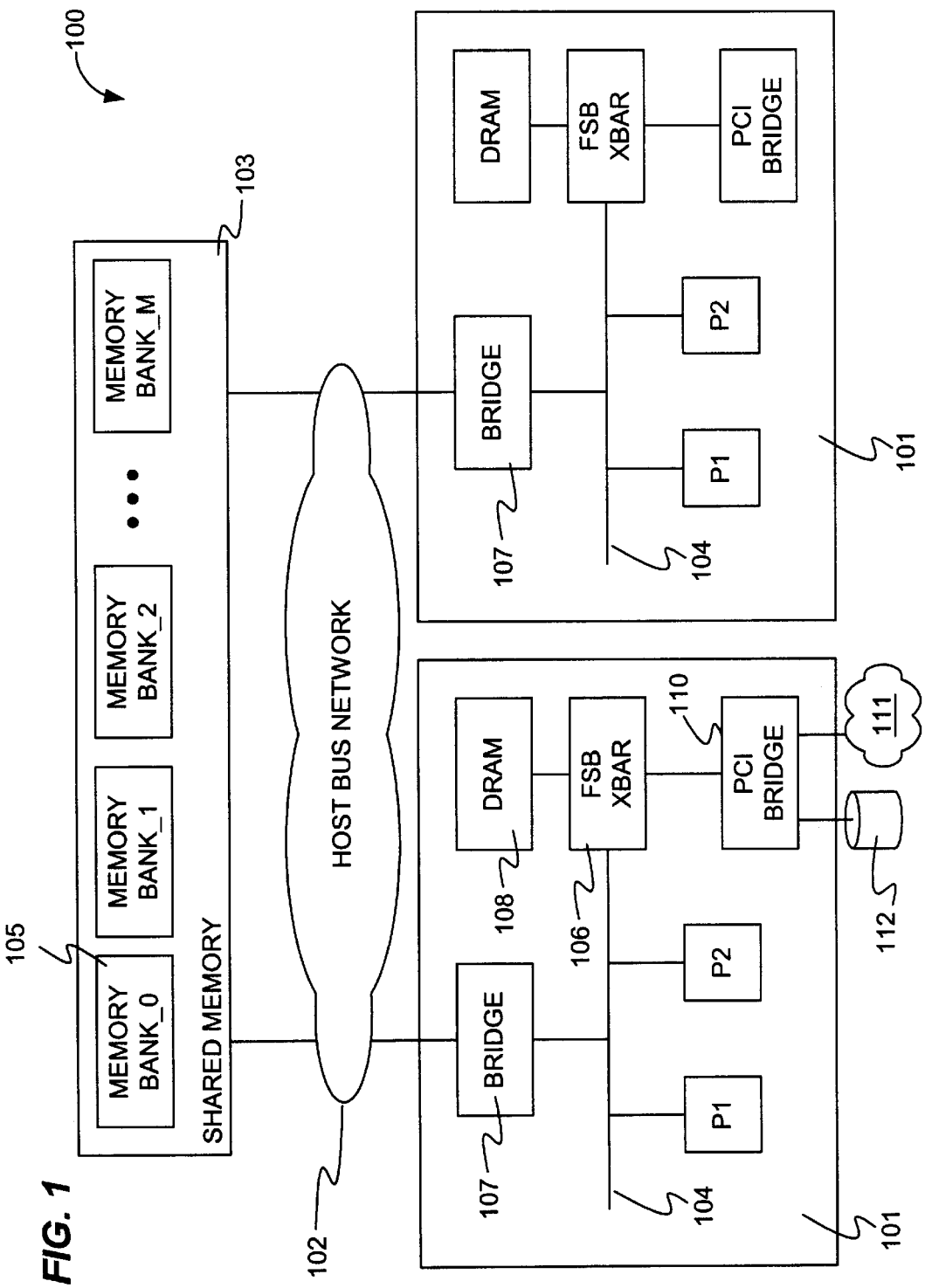
FIG. 1 shows a multiprocessor computer environment in which the present invention is implemented.

FIG. 1 shows a multiprocessor computer environment in which the present invention is implemented. Multiprocessor computer system 100 incorporates N processor boards 101. Each processor board 101 comprises one or more microprocessors, such as processors P1 and P2, having integrated cache memory in the particular examples. Processor boards 101 may be configured in groups sharing a common front side bus 104 and sharing a common gateway through a bridge 107 to host bus network 102. An exemplary processor is the Pentium® III Xeon™ processor manufactured by Intel Corporation which can be configured as single processors or in clusters of up to eight processors.

Processors 101 are bidirectionally coupled to shared memory 103 through host bus network 102. Host bus network 102 preferably implements a full crossbar connection enabling any processor board 101 to access any memory location implemented in any memory bank 105. Shared memory 103 is configured as a plurality M of memory banks 105. Each memory bank 105 may itself comprise a group of memory components. Preferably shared memory 103 is organized as a plurality of "lines" where each line is sized based on the architecturally defined line size of cache within processors 101. A line in memory or cache is the smallest accessible unit of data although the present invention supports memory architectures that permit addressing within a line.

Each processor board 101 may include a front side bus crossbar 106 that enables access to local memory 108 and peripheral component interconnect (PCI) bridge 110. In the particular examples local memory 108 is not included in the address space of shared memory 103 and is shared only amongst processors P1 and P2 coupled to the same front side bus 104 as the FSB crossbar 106. PCI bridge 110 supports conventional PCI devices to access and manage, for example, connections to external network 111 and/or storage 112. It is contemplated that some processor boards 101 may eliminate the PCI bridge functionality where PCI devices are available through other boards 101.

Significantly, the front side bus 104 of each processor board 101 is independent of the front side bus 104 of all other processor boards 101. Hence, any mechanisms provided by, for example, the IA32 instruction set to perform atomic operations or cache consistency will not work between processors located on different boards 101.

Memory operations are conducted when a processor P1 or P2 executes an instruction that requires a load from or store to a target location in memory 103. Input output devices and peripherals may also access memory, but for ease of description the examples herein refer only to memory operations conducted by processors. In executing a memory operation the processor first determines whether the target memory location is represented, valid and accessible in a cache. The cache may be onboard the processor executing the memory operation or may be in an external cache memory. In case of a cache miss, the memory operation is handled by bridge 107. Bridge 107 generates a access request to host bus network 102 specifying the target location address, operation type (e.g., read/write), as well as other control information that may be required in a particular implementation. Shared memory 103 receives the request and accesses the specified memory location. In the case of a read operation the requested data is returned via a response passed through host bus network 102 and addressed to the bridge 107 that generated the access request. A write transaction may return an acknowledgement that the write occurred. In the event an error occurs within shared memory 103 the response to bridge 107 may include a condition code indicating information about the error.

Figure 2:
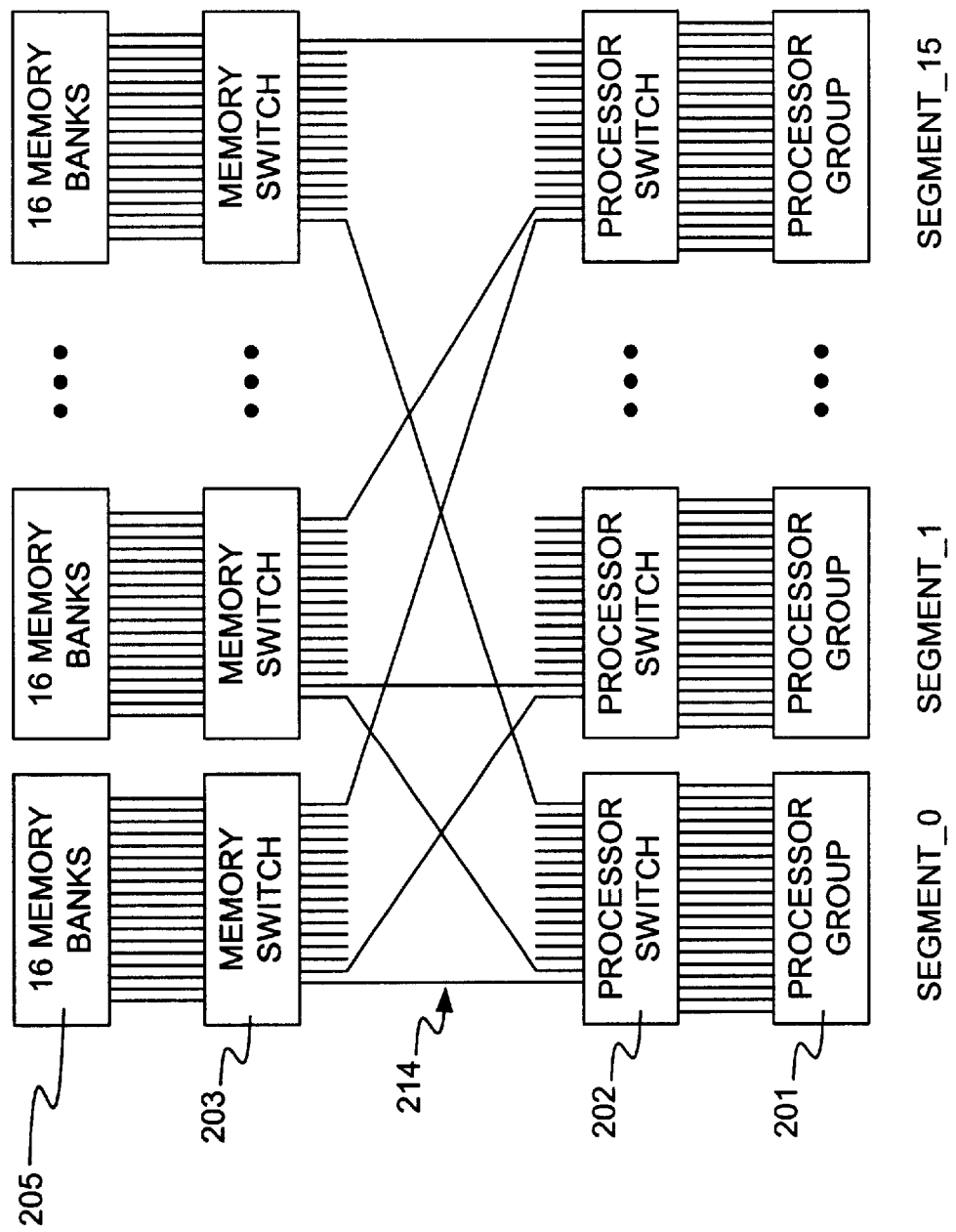
FIG. 2 shows portions of an exemplary multiprocessor in accordance with the present invention.

FIG. 2 illustrates a specific implementation and interconnect strategy for that implementation. In the implementation of FIG. 2 there are sixteen segments labeled SEGMENT_0 through SEGMENT_15. Each segment includes a processor group 201. A processor group 201 in a particular example includes sixteen pairs of processors (e.g., sixteen processor boards 101), each coupled to processor switch 202 through a bi-directional data and command bus interface implemented by bridge 107. Processor switch 202 includes an output to a trunk line 214 for each memory bank group 205. Similarly, each memory switch 203 includes an output to the trunk line 214 for each processor group 201. In this manner, any processor group can be selectively coupled to any memory bank group through appropriate configuration of processor switch 202 and memory switch 203.

Figure 3:
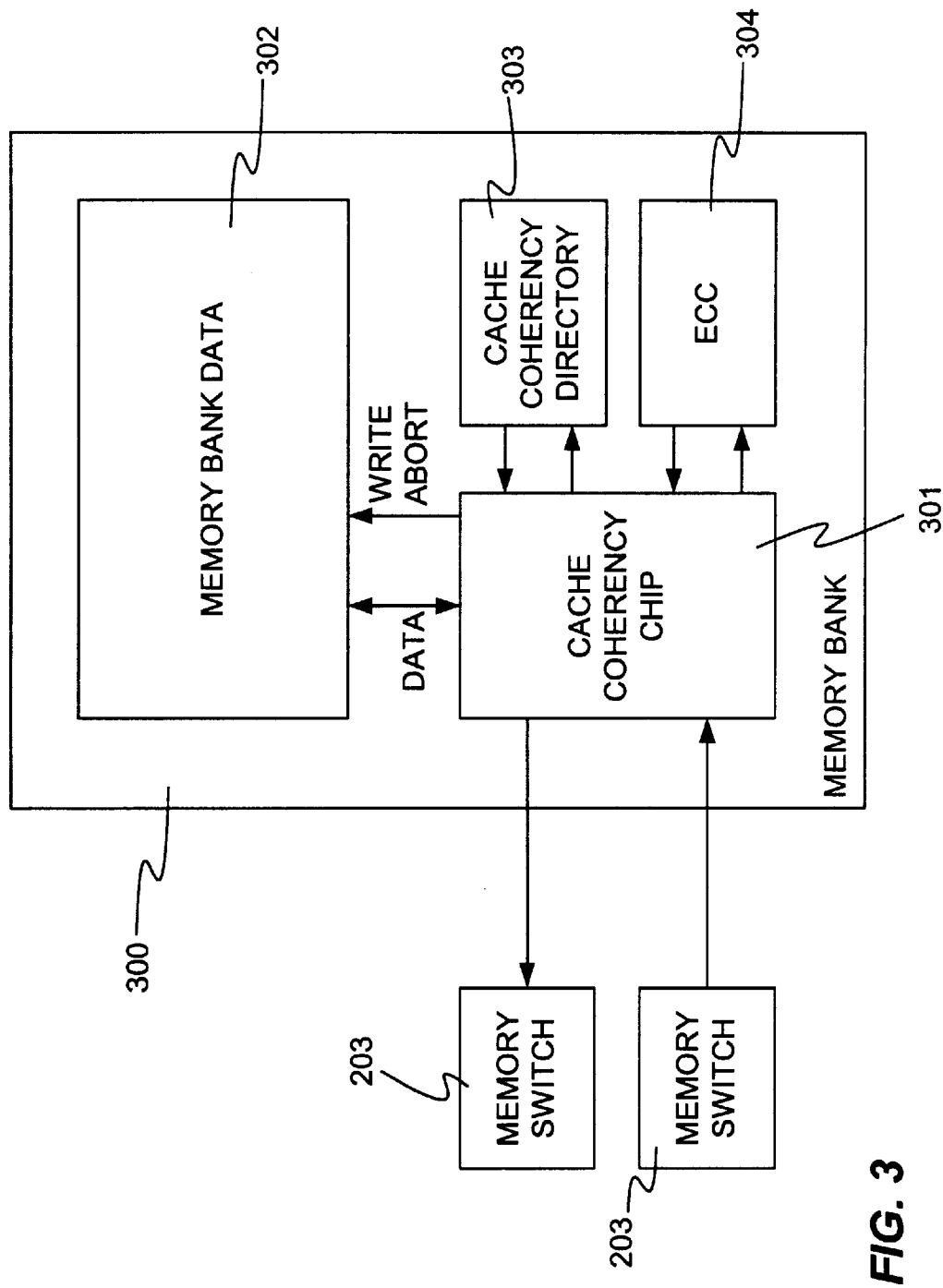
FIG. 3 illustrates cache coherency mechanisms associated with a memory bank in accordance with the present invention.

FIG. 3 shows important cache coherency mechanisms associated with a memory bank 300 in accordance with the present invention. Memory switches 203 communicate with trunk lines 214 (shown in FIG. 2) to send and receive memory access requests. Upon receiving a memory access request, memory switch 203 passes information including the target memory address and node identification, as well as control mode information to cache coherency chip 301. The target memory address refers to a location in memory bank data portion 302. The node ID is a value indicating a unique processor board 101 in a multiprocessor system that is initiating or receiving a reply to the memory operation. In a particular embodiment this information is passed between switch 203 and cache coherency chip 301 as a data packet having defined fields for the various types of information.

Cache coherency chip 301 may be implemented as a custom integrated circuit such as an ASIC, a one time or reprogrammable logic device such as a programmable gate array, or as discrete components coupled in a conventional circuit board or multi-chip module. Cache coherency chip 301 uses the memory address to access cache coherency directory 303. Cache coherency directory 303 includes a multi-bit entry for each memory line (i.e., cache line) in the shared memory address space of the particular memory bank data portion 320. The entry contains a value indicating the current state of the corresponding memory line.

In a particular example, the memory bank is configured to support from 64 to 256 MBytes of memory hence directory 303 may include on the order of 2 to 8 million entries for 256 bit wide memory lines (i.e., 32 bytes per cache line). In the particular example, each entry in directory 303 is 36 bits wide. The entry does not have a fixed format in that the meaning given to any particular bit in an entry is dependent on the state of the entry as described in greater detail hereinafter.

Cache coherency directory 303 may also include a node presence vector that indicates which processor nodes 101 are currently represented in directory 303. In a particular example a 16-bit value is used in a bit-map fashion to indicate which of 16 processor nodes 101 are represented. Each bit may represent a cluster or segment comprising multiple processors. The node presence vector can be queried rapidly to identify which nodes must be informed of a cache coherency operation.

Preferably, memory bank 300 also includes error correcting mechanisms 304. Cache coherency chip 301 receives mode bits as a part of the memory access packet from switch 203. These mode bits indicate what type of data packet is being presented by the memory switch as indicated in Table 1 or what type of packet is being presented to the memory switch 203 in Table 2. Error correcting mechanism 304 uses the mode information to identify and correct, if possible, errors before accessing coherency directory 303. Error correcting code is used to correct data. Address errors are identified by parity bits and are usually not correctable. These mechanisms avoid memory errors caused by bit errors arising during communication between processor nodes 101 and memory bank 300.

The terminology used in Table 1 uses Intel architecture terminology although other processor architectures have substantially equivalent terminology to describe substantially equivalent bus operations. In Table 1, "BRL" means Bus Read Line and "BWL" means Bus Write Line. "BRIL" refers to a Bus Read and Invalidate Line. "HITM#" means Hit on Modified data whereas "HIT#" means Hit on clean data.

TABLE 1

Mode Request (request packet)

| | Definition | |
|---|---|---|
| Mode Request | Read operation | Write operation |
| 000b | Read (BRL) Data | Write (BWL) |
| 001b | Read (BRL) Code | Implicit Writeback (HITM#) |
| 010b | BRIL | |
| 011b | | |
| 100b | Line Share - Not Present | Line Share -Data (HITM#) |
| 101b | Line Share - No Data (HIT#) | |

TABLE 1-continued

Mode Request (request packet)

| | Definition | |
|---|---|---|
| Mode Request | Read operation | Write operation |
| 110b | Line Invd - Not Present | Line Invd - Data (HITM#) |
| 111b | | |

TABLE 2

Mode Reply

| Mode Request | Definition |
|---|---|
| 000b | CMPL |
| 001b | CMPL_SH |
| 010b | RETRY_BE |
| 011b | RETRY |
| 100b | CC Error Response |
| 101b | AP Error |
| 110b | CC Error Notification |
| 111b | CC Invalidate/share Request |

In operation memory requests are presented by switch 203 and a memory reply is generated by memory band 300. The memory requests may be to read from or write to a memory address which implies certain cache coherency operations. The memory request may also be an explicit cache coherency request such as a command to share a specified line or invalidate a specified line. Replies may include data and cache coherency state. Memory bank 300 may also generate replies that indicate an error condition was generated by the request, a simple completion or acknowledge of a requested operation, and direction to retry a request.

Figure 4:
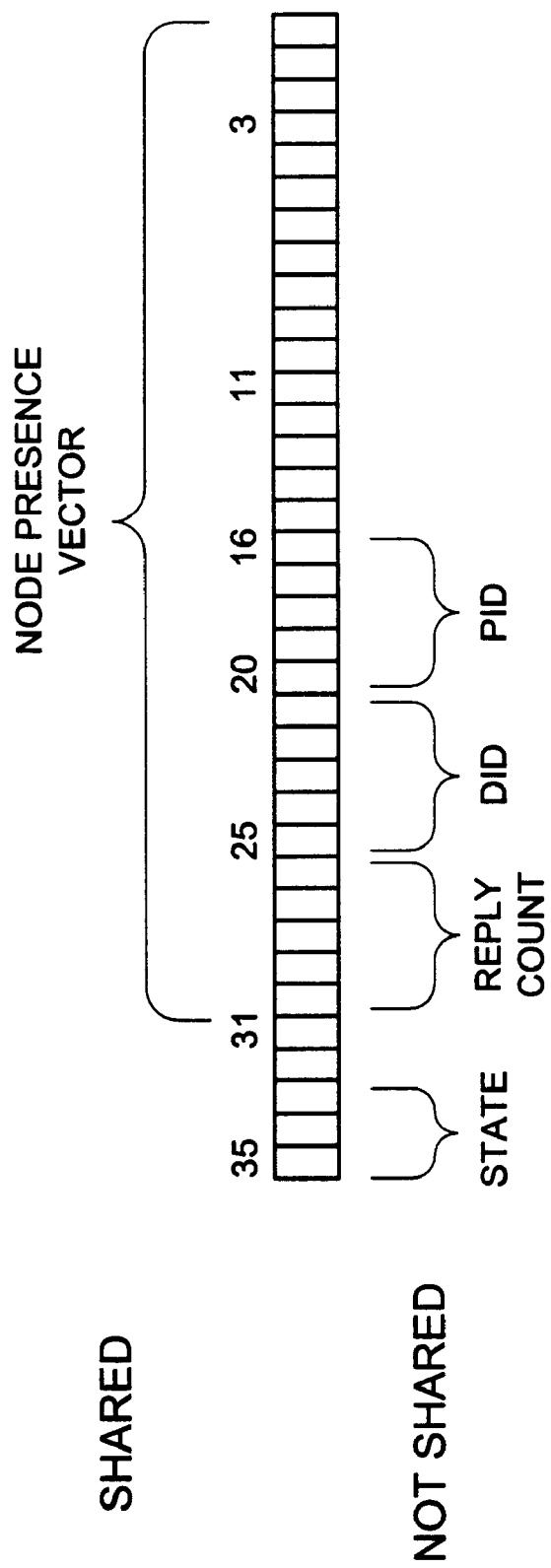
FIG. 4 shows an exemplary cache coherency directory entry.

FIG. 4 shows an exemplary cache coherency directory entry 400. The specific example of FIG. 4 is a 36-bit entry having state-specific fields defined below. However, it is contemplated that different entry sizes can be used with different field sizes, designations, and functionality without departing from the teachings of the present invention. Various mnemonics are used in the illustrations and discussions as defined in table 3.

TABLE 3

Mnemonic definitions

| QRC (outstanding reply counter) | Number of outstanding transactions |
|---|---|
| DID | Current directory Node ID |
| PID | Pending directory Node ID |
| RID | Requesting node ID |
| Ex | Exclusive |
| Sh | Shared |
| Uc | uncached |
| B | Busy |
| Buc | Busy uncached |
| Rd | Read |
| RdEx | Read exclusive |
| RdShr | Read Shared |
| RdUc | Read Uncached |
| RdLk | Read Locked |
| Wr | Write |
| Wb | Write Busy |
| WrUc | Write Uncached |
| WrLk | Write Locked |

In general, the three most significant bits <33:35> are used to indicate which of the seven cache state (exclusive, shared, uncached, busy, busy_uncached, locked and pending) is applicable to a cache line. Bit 35 indicates exclusivity, bit 34 indicates shared/locked state, and bit 33 indicates busy state, although this assignment is not critical to the practice of the present invention.

Interpreting the remaining bits depends on the recognition of which cache state is indicated. The least significant bits <31:0> hold the node presence vector in the shared cache state. In the unshared cache state, bits <16:20> hold a pending node ID (PID) value whereas bits <21:25> hold a current directory processor node ID (DID) value. In the particular example of FIG. 4 bits <30:26> hold a counter value. Most of the states do not use all of the fields. Unused fields are ignored and may have any value or be eliminated in certain implementations. However, by having a general format indicated in FIG. 5 state transitions are simplified because a portion of the directory state information (e.g., a DID value) may already stored in the directory entry.

In the exclusive state the DID field holds a node ID value identifying the processor node 101 that holds exclusive access. In the shared state, only the node presence vector is needed to indicate which nodes have shared access to the cache line. In the Busy state, DID indicates the node ID currently holding exclusive access (if any). The PID field identifies a processor node 101 with a pending cache coherency request. The busy state also includes a field indicating a reply count that indicates a number of outstanding transactions (i.e., the number of replies expected). The pending state uses only the PID value. The busy state, described above, with a reply count value of zero is substantially equivalent (i.e., an alias) to the pending state. The locked state uses only the DID field to indicate the processor node 101 owning the locked cache line.

The busy_uncached field indicates that a cache line that was either exclusive or shared has had an uncached write and the cache line is waiting for invalidates to be completed. The busy_uncached state uses the DID field to identify the processor node 101 that executed the uncached write and the reply count field to indicate the number of expected replies indicating the invalidates have completed. The uncached state does not use any of the field values and indicates that the cache line is not currently allocated to any node's cache hierarchy.

Figure 5:
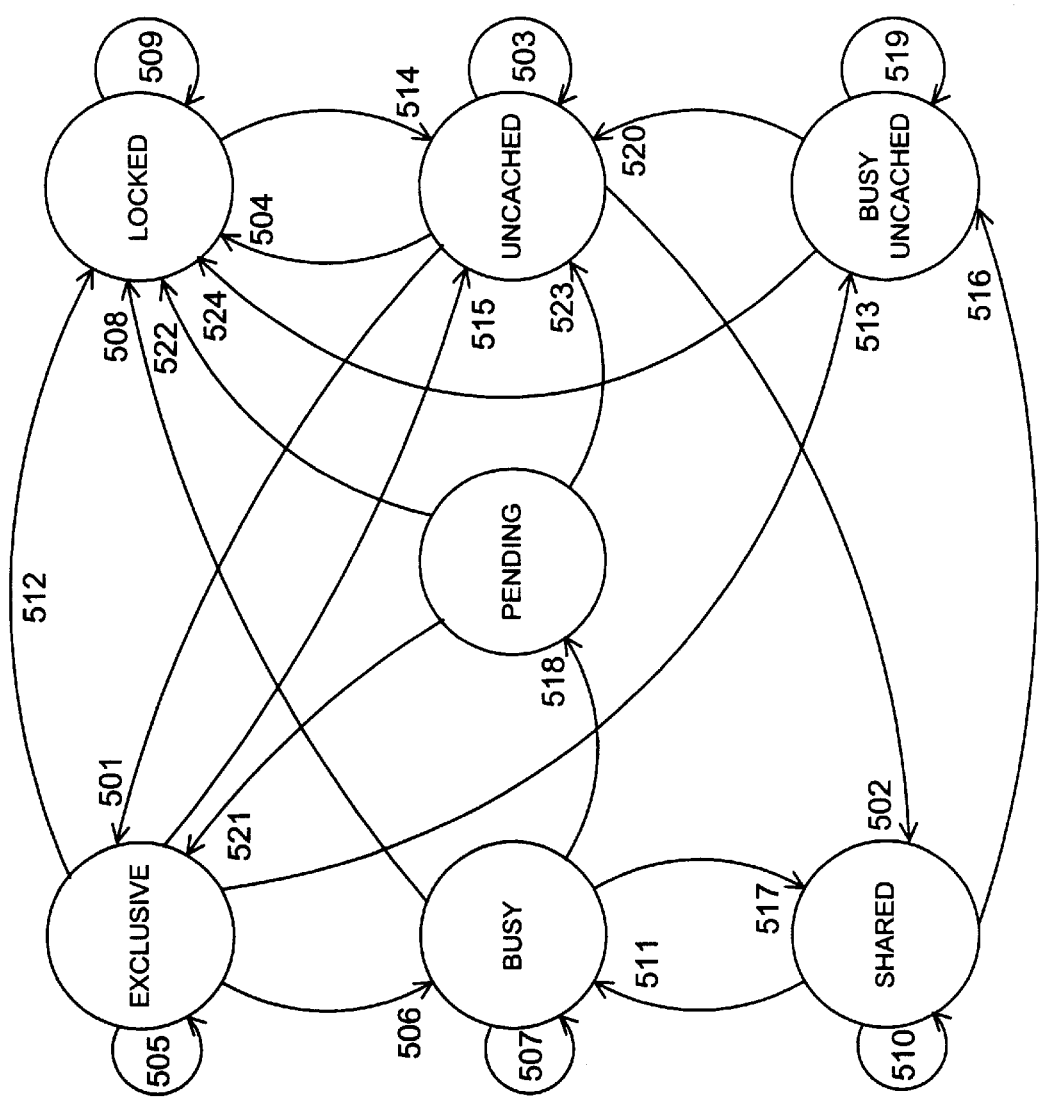
FIG. 5 shows a state diagram illustrating operation of a cache coherency mechanism in accordance with the present invention.

FIG. 5 shows a state diagram illustrating operation of a cache coherency mechanism in accordance with the present invention. The states shown in FIG. 5 are implemented for a given memory line by appropriate values stored in the cache coherency directory 303. The memory states shown in FIG. 5 have the general meaning with respect to the associated cache line:

Exclusive: zero or one node has exclusive access to the cache line

Shared: zero or one or more nodes have the cache line

Uncached: zero nodes have the cache line

Busy and Busy uncached: waiting for the cache coherency requests to complete

Locked: an uncached lock operation is in progress

Pending: waiting for a retry from the node that initiated an exclusive state change The cache coherency protocol in accordance with the present invention defines twenty four transitions between the seven defined cache coherency states. Table 4 describes various cache coherency scenarios along with the associated action. In Table 4 the following terms should be noted:

The symbol → Indicates that a cache coherency request is sent.

ORC means Outstanding Reply Count which is used in cache coherency invalidation operations and locked operations Reply Codes:

ERROR indicates the requested action and cache line state are inconsistent.

CMPL (Complete) indicates a Normal completion of cache lines exclusive and uncached operation done.

CMPL_SHR indicates Normal complete—Cache line shared (HIT#).

RETRY indicates that a Request can not be serviced now, try again.

RETRY_BE indicates that a Request can not be serviced now, try again. However, if original request was BIL, convert to BRIL, reply with data.

Busy Implies that PID is valid when transaction is complete pending.

Busy UC Does not have a PID associated when transaction is complete line uncached.

In addition, SHRVECT[] is used throughout Table 4 to indicate Node Presence Vector[]. Each state transition in Table 4 matches a similarly numbered transition in FIG. 5. In Table 4, the state transition is described followed by a first column indicating which of the fields in the cache coherency directory entry shown in FIG. 4 are used. A second column indicates the memory inbound state and a third column indicates the action taken to modify the directory entry.

TABLE 4

| State transitions | | |
|---|---|---|
| 501) Uncached → Exclusive | | |
| RID ignored | Rd, RdEx | DID = RID |
| 502) Uncached → Shared | | |
| RID | RdShr | SHRVECT [RID] = 1 |
| 503) Uncached → Uncached | | |
| RID ignored | RdUc, WrUc (any length) | |
| 504) Uncached → Locked | | |
| RID ignored | RdLk | DID RID ORC 1 |
| 505) Exclusive → Exclusive | | |
| RID = DID | Rd, RdEx, RdShr, RdUc Wr, WrWb | |
| 506) Exclusive → Busy | | |
| RID:P DID | Rd, RdShr, RdUc | ShrReq→DID ORC = 1 PID = RID |
| | RdEx, RdLk, WrUc (len ≠ 32) | InvReq→DID ORC = 1 PID = RID |
| 507) Busy → Busy | | |
| RID DID | Rd, RdEx, Rdshr, RdUc, Wr, WrWb, WrUc | |
| RID DID | Rd, RdEx, RdShr, RdUc, RdLk, WrUc | |
| RID ignored | InvRep (ORC ≠ 1) | |

TABLE 4-continued

State transitions

| | | |
|---|---|---|
| 508) Busy → Locked | | |
| RID = DID | RdLk, WrWb+Lk | ORC ORC + 1 |
| 509) Locked → Locked | | |
| RID = DID | RdLk, WrWb+Lk (split lock) | ORC = ORC + 1 |
| | WrLk (ORC≠1) | ORC = ORC − 1 |
| | ShrRep (ORC≠1) | |
| | ShrNpRep (ORC ≠ 1) | |
| RID ignored | InvRep (ORC ≠ 1) | ORC = ORC − 1 |
| 510) Shared → Shared | | |
| RID ignored | Rd, RdShr, RdUc | SHRVECT [RID] = 1 |
| 511) Shared → Busy | | |
| RID iqnored | RdEx, RdLk | InvReq SHRVECT [ridset] ORC=popcnt (SHRVECT [1]) * *popcnt implies a count of the number of bits set in a bit vector |
| 512) Exclusive → Locked | | |
| RID= DID | RdLk, WrWb+Lk | ORC= 1 |
| 513) Exclusive → BusyUc | | |
| RID DID | WrUc (len = 32) | InvReq DID, ORC = 1 |
| 514) Locked → Uncached | | |
| RID DID | WrLk (ORC = 1) | |
| | ShrRep (ORC = 1) | |
| | ShrNpRep (ORC =1) | |
| RID ignored | InvRep (ORC = 1) | |
| 515) Exclusive → Uncached | | |
| RID = DID | WrUc (Possibly RdUc) | |
| 516) Shared → BusyUc | | |
| RID ignored | WrUc | InvReq→SHRVECT [ridset] ORC=popcnt (SHRVECT [ ]) |
| 517) Busy → Shared | | |
| RID = DID | ShrRep (ORC = 1) | SHRVECT [RID]=1 |
| 518) Busy Pending | | |
| RID = DID | ShrNpRep (ORC = 1) | DID = PID |
| RID ignored | InvRep (ORC = 1) | DID = PID |
| 519) BusyUc → BusyUc | | |
| RID ignored | InvRep (ORC ≠ 1) | |
| 520) Busyuc → Uncached | | |
| RID ignored | InvRep (ORC = 1) | |
| 521) Pending → Exclusive | | |
| RID = DID | Rd, RdEx | |
| 522) Pending → Locked | | |
| RID = DID | RdLk | ORC = 1 |
| 523) Pending → Uncached | | |
| RID = DID | RdUc | |
| 524) Pending → Pending | | |
| RID ≠ DID | Rd, RdEx, RdShr, RdUc, RdLk | |

Whenever a node initiates a cached read to a line in memory, the state of the cache line on completion of the transaction in the node can be either:

NODE

Exclusive: if no other node had the line.

Shared: if one or more nodes have the line.

Whenever a node requests exclusive access to a cache line, the following can happen:

Cache Coherency Directory

Exclusive: a cache coherency invalidate request is sent to the current node that has exclusive access to the cache line.

Shared: a cache coherency invalidate request is sent to all the nodes that are set in the node presence vector in a cache coherency directory entry.

Locked or Busy: the node polls the memory waiting for the line to drop to the uncached state (similar to Exclusive and Shared above, but the requesting node does not cause a state change).

Uncached: the node is immediately granted exclusive access to the line.

In either Exclusive or Shared mode, the requesting node has to poll the memory bank and wait for the cache coherency invalidation requests to complete before the requesting node can exclusively access the line.

When a cache line transitions from either the exclusive or shared state to busy, the "Outstanding Reply Count" (ORC) in its corresponding cache coherency directory entry is set to the number of replies expected from nodes that receive a cache coherency request. There is only one reply per node for cache coherency requests to either invalidate or share a currently exclusive line.

There are multiple replies for cache coherency invalidates to currently shared lines because each bit in the presence vector subfields of directory can represent multiple nodes. However, individual bits in the presence vector represent a fixed and known number of physical nodes. The example implementation defines one node per bit in the presence vector.

General Transaction Flow

Read (Rd) (cached/uncached), Uncached Writes—Originate at a node, are sent to memory and acknowledge/retry packet is returned to the bridge.

Cache Coherency Operations—Originate at a memory bank, are sent to the node and a reply (with/without data) is returned to the memory bank.

Writebacks—Originate at a node and terminate at a memory bank. No acknowledge is expected to be returned from the memory bank for normal processing.

The following describes the general sequence of events of the cache coherency process.

1. Initial state of cache lines are uncached.

2. Uncached lines are upgraded to either exclusive or shared status by the following actions:

Exclusive (Ex) : A node cached data or exclusive read operation. While a node has exclusive access to a cache line, any operation by the owning node (i.e., DID) is permitted.

Share (Shr): A node cached code read.

3. Exclusively held cache lines can transition to either exclusive or shared:

Ex: Another node performs a shared read of the cache line and the cache line is no longer present in the original node.

Ex: Another node performs an exclusive read of the cache line. The cache line is downgraded with an invalidate request from Exclusive to Uncached. Once the cache line returns to the uncached state, the original requesting node is allowed to make forward progress. In the example implementation, there are provisions to block subsequent nodes other than the original requester from accessing the cache line.

Shr: Another node performs a shared read of the cache line and the cache line is still presently active in the original node. The cache line accessed from the original node is downgraded to shared with a possible writeback of modified data. In the example 4. Exclusive and shared lines are downgraded to uncached when a node performs an exclusive write operation and/or a read uncached operation (usually uncached input/output). Unlike event 3 above, once the cache line's state is uncached, there are no provisions to prevent other nodes from gaining access to the cache line before the original requesting node has completed its transaction. However, in both situations, because the original requesting node is continuously retrying its request, the whole state transition flow can be restarted.

5. Locked reads and writes, which are by definition uncached operations, to exclusive or shared cache lines cause the line to be downgraded to uncached. From uncached, the line is upgraded to locked. Where a node already has exclusive access to the cache line, and a locked operation is performed (LOCK#), the cache line transitions to the locked state without first having to be completely downgraded to uncached.

The cache coherency methodology and mechanism described herein offers several advantages over conventional coherency protocols such as the MESI protocol. A cache coherency transaction in a multiprocessor system is to migrate exclusive control over a cache line from one processor to another processor. Using conventional directory-based protocols this requires a cache line state transition from exclusive to uncached or shared. A message is sent back to the second processor that the cache line is now available, and the second processor attempts a retry of the read to the now uncached line causing it to upgrade to exclusive. While in the is uncached or shared state, any other processor can intervene and take exclusive control over the line, thwarting the efforts of the second processor.

Figure 6:
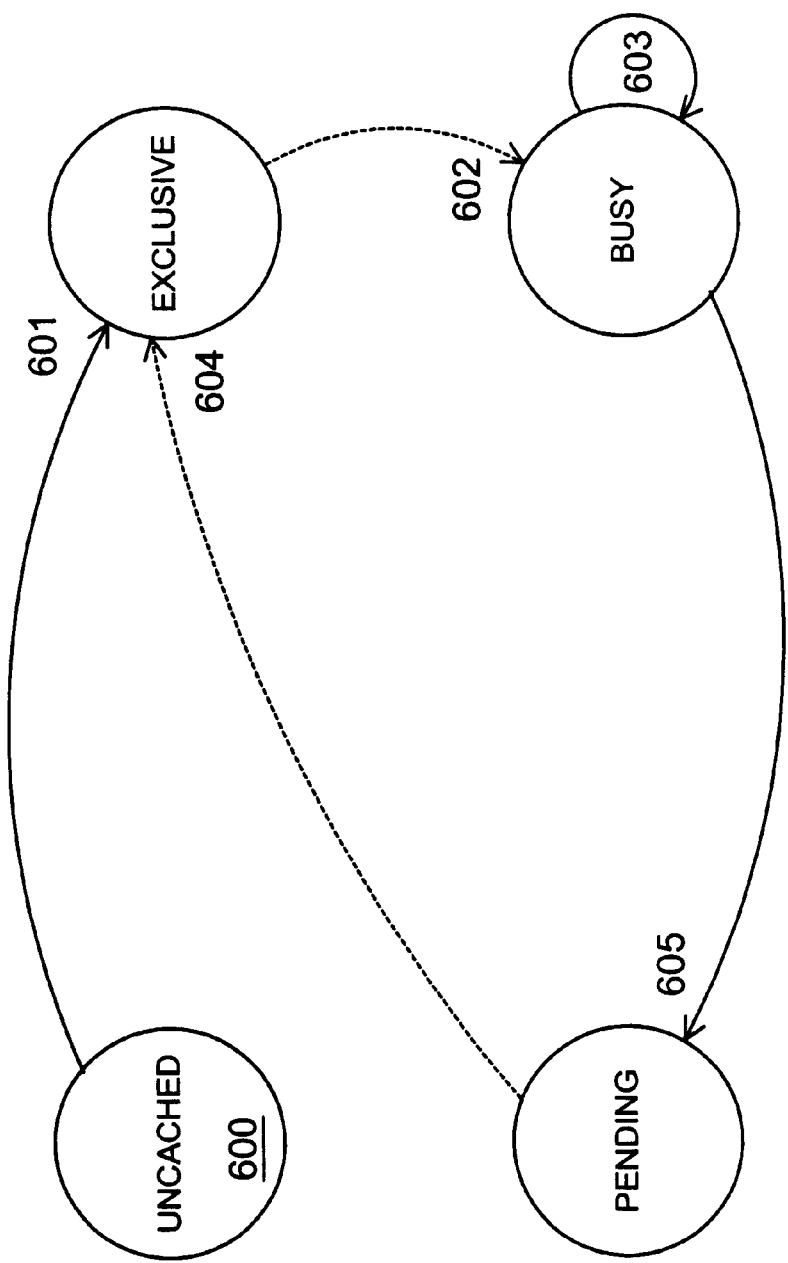
FIG. 6 shows a simplified state diagram illustrating a state transitions used to transfer ownership of a memory location from a first processor node to a second processor node.

In contrast, the present invention provides busy and pending states that function to allow the second processor to reserve a cache line while control is held by the first processor. This avoids the "race" condition where a processor desiring exclusive access repeatedly fails. Table 5 describes the steps in this migration process in reference to the states and state transitions shown in FIG. 6 with solid line transitions indicating actions by the first processor and dashed line transitions indicating actions by the second processor.

TABLE 5

| Transition | | Description |
|---|---|---|
| 600 | | Uncached cache line not allocated to any node |
| 601 | a | Node 0 requests the cache line (either read or read exclusive) |
| | b | Cache line transitions from uncached to exclusive. Directory ownership (DID) is set to Node 0. |
| 602 | a | Node 1 requests the cache line exclusively (read exclusive) |
| | b | Coherency operation to invalidate the cache line is sent to Node 0. |
| | c | The cache line transitions from exclusive to busy, with ORC=1. |
| | d | The Pending ID (PID) in the directory is set to Node 1. |
| | e | Node 1 is sent a retry reply. |
| 603 | a | The cache line remains in the busy state waiting for a coherency reply from Node 0. |

TABLE 5-continued

| Transition | | Description |
|---|---|---|
| | b | Node 1 continues to retry its read and will receive retry replies while the cache is busy. |
| 604 | a | Node 0 sends a coherency reply to original request in 2b. |
| | b | Cache line transitions from busy to pending. |
| 605 | a | Node 1 continues to retry its oriqinal request. |
| | b | Requesting ID (RID) matches Pending ID and Node 1 is granted exclusive access to cache line |
| | c | Cache line transitions to exclusive, Directory ID = Node 1. |

It should be appreciated that a system and method for providing cache coherency and atomic memory operations in a multiprocessor computer architecture is provided. The present invention does not require or rely on microprocessor-specific features bus snooping or replacement hints to provide coherency and atomic memory operations. Hence, the present invention can be implemented with a great deal of flexibility in microprocessor choice and is readily scaleable to very large processor counts. Moreover, the present invention supports sharing of memory space across large processor count designs.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of implementing atomic uncached references within a multiprocessor system comprising a plurality of independent processor nodes, and a shared memory comprising a plurality of memory locations the method comprising:

implementing a cache within at least some of the processor nodes, each cache comprising a plurality of cache entries;

associating a state machine with each memory location, wherein the state machine includes an exclusive state, a locked state, a busy state, a pending state, an uncached state, a shared state and a busy uncached state;

conducting a current memory operation including copying contents of a memory location into the cache of a first processor node;

in response to a pending memory operation involving the memory location, indicating that the cache line in the first processor node contains a copy of information that is desired by a second processor node and transitioning the state machine for the memory location to the busy state;

in response to an indication that the first processor node has terminated the current operation, transitioning the state machine for the memory location to the pending state, wherein while in the pending state the memory location is locked from access by any of the processor nodes.

2. The method of claim 1 wherein the state machine is responsive only to an indication that the second processor node is ready to proceed with the pending operation while in the pending state.

3. The method of claim 1 wherein the busy state includes an identification of the first processor node that is in the process of completing a cache coherency transaction and an identification of the second processor node which has a pending cache coherency operation.

4. The method of claim 3 wherein transitioning to the busy state comprises:

transitioning from the exclusive state to the busy state;

sending a request to the first processor node to invalidate the cache line in the first processor node's cache so as to terminate the exclusive state;

setting an outstanding reply count value held in the busy state to a value of one; and remaining in the busy state until the first processor node confirms that the cache line is invalidated in the first processor node's cache.

5. The method of claim 4 wherein during the busy state only cache line accesses from the first processor node are enabled.

6. The method of claim 3 wherein transitioning to the busy state comprises:

transitioning from the shared state to the busy state, wherein the shared state includes a node presence vector indicating each processor node that currently has a copy of the cache line;

sending a request to each processor node indicated in the node presence vector to invalidate the cache line in the so as to terminate the shared state;

setting an outstanding reply count value held in the busy state to a value equal to the number of processor nodes represented in the node presence vector; and remaining in the busy state until each processor node in the node presence vector confirms that the cache line is invalidated in its own cache.

7. A cache coherency directory for a shared memory multiprocessor computer comprising:

a data structure associated with each cacheable memory location, the data structure comprising locations for storing state values indicating an exclusive state, a shared state, an uncached state, a busy state, a busy uncached state, a locked state, and a pending state, wherein the busy state and pending state cooperate to reserve a cache line for future use by a processor while the cache line is currently being used by one or more other processors.

8. The cache coherency directory of claim 7 further comprising:

means responsive to a request to access a cached memory location for determining the state values associated with the requested memory location stored in the data structure;

means responsive to a request to access a cached memory location for issuing cache coherency operations based on the state values;

means responsive to a request to access a cached memory location for transitioning the state values between indicated states in a predefined order.

9. The cache coherency directory of claim 7 wherein he exclusive state indicates that zero or one node has exclusive access to the cache line.

10. The cache coherency directory of claim 7 wherein the shared state indicates that zero or one or more nodes have shared access to the cache line.

11. The cache coherency directory of claim 7 wherein the uncached state indicates that zero nodes have exclusive or shared access to be cache line.

12. The cache coherency directory of claim 7 wherein busy and busy uncached states indicate that the cache line has transitioned from either exclusive or shared state and has cache coherency replies outstanding.

13. The cache coherency directory of claim 7 wherein the pending state indicates the cache line has been released from an exclusive state that is reserved for another node that presented a request for the cache line while the cache line was in an exclusive or shared or busy state.

14. A computing system comprising:

a plurality of processor nodes coupled to a communication bus;

a cache memory within each of the processor nodes, the cache memory comprising a plurality of cache lines;

a shared memory comprising a plurality of cacheable locations; and a state machine associated with each cacheable location of the shared memory, the state machine implementing a state indicating that the associated cacheable location is currently in use by a first processor node and reserved for future use by a second processor node, the state machine comprising a busy state holding values indicating the associated cache line is currently busy, an indication of which processors control the associated cache line, and an indication of which processor is reserving the cache line for future use.

15. The computing system of claim 14 wherein the state machine further comprises a pending state holding value indicating the associated cache line is currently locked and can be transitioned away from the pending state only by an indication from the second processor.

16. The computing system of claim 14 wherein the state machine transitions from a state indicating exclusive control by the first processor to a state indicating exclusive control of a second processor without entering a state in which the associated memory location is cacheable by any other processor.

17. The computing system of claim 14 wherein each processor node comprises two or more processors coupled to each other by a shared front side bus.

18. The computing system of claim 17 further comprising a bridge circuit coupling the front side bus of each processor node to the communication bus.

19. A computing system comprising:

a plurality of processor nodes coupled to a communication bus;

a cache memory within each of the processor nodes, the cache memory comprising a plurality of cache lines;

a shared memory comprising a plurality of cacheable locations; and a state machine associated with each cacheable location of the shared memory, the state machine implementing a state indicating that the associated cacheable location is currently in use by a first processor node and reserved for future use by a second processor node.

* * * * *

UNITED STATES PATENT AND TRADEMARK OFFICE
CERTIFICATE OF CORRECTION

PATENT NO. : 6,356,983 B1
DATED : March 12, 2002
INVENTOR(S) : David Parks

It is certified that error appears in the above-identified patent and that said Letters Patent is hereby corrected as shown below:

<u>Column 15,</u>
Line 30, delete "in the"
Line 62, change "he" to -- the --

Signed and Sealed this

Twenty-fifth Day of June, 2002

Attest:

JAMES E. ROGAN
*Attesting Officer*     *Director of the United States Patent and Trademark Office*